(12) United States Patent
Tsuzuki

(10) Patent No.: US 7,355,644 B2
(45) Date of Patent: Apr. 8, 2008

(54) LINEAR IMAGE SENSOR

(75) Inventor: Takao Tsuzuki, Kanagawa (JP)

(73) Assignee: NEC Electronics Corporation, Kanagwa (JP)

( * ) Notice: Subject to any disclaimer, the term of this patent is extended or adjusted under 35 U.S.C. 154(b) by 763 days.

(21) Appl. No.: 10/673,518

(22) Filed: Sep. 30, 2003

(65) Prior Publication Data

US 2004/0141214 A1    Jul. 22, 2004

(30) Foreign Application Priority Data

Jan. 21, 2003   (JP)   ............... 2003-012804

(51) Int. Cl.
   *H04N 3/14*   (2006.01)
   *H04N 5/335*   (2006.01)
(52) U.S. Cl. ............... 348/299; 348/321; 348/323
(58) Field of Classification Search ........ 358/513, 358/514; 348/296, 299, 321, 323
   See application file for complete search history.

(56) References Cited

U.S. PATENT DOCUMENTS 6,002,497 A * 12/1999 Hirama ............... 358/514
6,028,299 A *  2/2000 Hirama et al. ....... 250/208.1
6,473,125 B1* 10/2002 Kuno ................... 348/296
6,791,614 B1*  9/2004 Kimura ................ 348/323

FOREIGN PATENT DOCUMENTS

JP       7-226495 A     8/1995

* cited by examiner

*Primary Examiner*—Lin Ye
*Assistant Examiner*—Kelly Jerabek
(74) *Attorney, Agent, or Firm*—Sughrue Mion, PLLC

(57) ABSTRACT

In a linear image sensor, a shutter structure includes: a shutter gate electrode provided between photodiode arrays; and a shutter drain provided below the shutter gate electrode. With this construction, a layout area is reduced and the number of scanning operations performed in the auxiliary scanning direction necessary to obtain image data for one line is reduced. As a result, the capacity of a memory used is reduced and the influence of color drift is suppressed.

9 Claims, 8 Drawing Sheets

1a,1b  PHOTODIODE ARRAY
3a,3b  CCD SHIFT REGISTER
5      SHUTTER GATE 2a,2b  READOUT GATE
4a,4b  OUTPUT CIRCUIT
6      SHUTTER DRAIN

| 101a,101b | PHOTODIODE ARRAY | 102a,102b | READOUT GATE |
| 103a,103b | CCD SHIFT REGISTER | 104a,104b | OUTPUT CIRCUIT |
| 105a,105b | SHUTTER GATE | 106 | SHUTTER DRAIN |

1a,1b PHOTODIODE ARRAY  2a,2b READOUT GATE
3a,3b CCD SHIFT REGISTER  4a,4b OUTPUT CIRCUIT
5 SHUTTER GATE  6 SHUTTER DRAIN

400
LINEAR IMAGE SENSOR

BACKGROUND OF THE INVENTION

1. Field of the Invention

The present invention relates to a linear image sensor, and more particularly to a linear image sensor that is capable of reducing a layout area.

2. Description of the Related Art

As a conventional technique, JP 07-226495 A discloses a linear image sensor in which a shutter structure is provided between photodiode arrays. FIG. 1 shows an example of an overall construction of such a linear image sensor having an electric shutter structure between photodiode arrays. FIG. 2 is a cross-sectional view taken along the line C-C' of FIG. 1 and is a channel potential diagram thereof.

In this linear image sensor, electric charges photoelectrically converted by and accumulated in each photodiode of photodiode arrays 101a and 101b are read by readout gates 102a and 102b into CCD shift registers 103a and 103b that are respectively adjacent to the readout gates 102a and 102b. The electric charges read into the CCD shift registers 103a and 103b are sequentially transferred by the CCD shift registers 103a and 103b that perform two-phase ($\phi 1$, $\phi 2$) driving and are outputted to the outside by output circuits 104a and 104b. The output circuits 104a and 104b are each formed of a signal charge detection unit and an analog circuit such as a source follower circuit or an inverter. Here, the signal charge detection unit is formed of a floating diffusion region and converts signal charges into a signal voltage.

On the other hand, in the linear image sensor, shutter gates 105a and 105b are positioned on a side opposite to the readout gates 102a and 102b with the photodiode arrays 101a and 101b in-between. The shutter gates 105a and 105b discharge the electric charges photoelectrically converted by and accumulated in each photodiode of the photodiode arrays 101a and 101b to a shutter drain 106, thereby performing adjustment of an exposure time period.

As shown in FIG. 2, this linear image sensor has a structure where the photodiode arrays 101a and 101b that are each formed of an N-type region 111 and a P-type region 112, the readout gates 102a and 102b and the shutter gates 105a and 105b that are each formed of a polycrystalline silicon electrode 114b, the CCD shift registers 103a and 103b that are each formed of a polycrystalline silicon electrode 114a and an N-type region 110, and the shutter drain 106 formed of an N-type region 115 are provided on a P-well 108 formed on an N-type silicon substrate 107.

Also, in FIG. 2, reference numeral 113 denotes a thermal oxidation film and reference numeral 116 indicates an interlayer insulating film. Here, a metallic wiring made of aluminum or the like for supplying an input clock signal to each of the polycrystalline silicon electrodes 114a and 114b is omitted because the metallic wiring is not required for explanation of the present invention.

When a color linear image sensor is constructed, three linear image sensors having the construction described above are provided parallel to each other on the N-type silicon substrate 107 and color filters having different colors (green, blue, red) are respectively overlaid on the photodiode arrays 101a and 101b of the three linear image sensors. In this case, it is required to adjust an exposure amount (product of the amount of light incident on the photodiodes and an accumulation time period) for each color.

One of characteristics that determine the performance of an image sensor is a saturation output voltage. In general, the output signal voltage of an image sensor is proportional to an exposure amount (product of the amount of light incident on a light-receiving portion and an accumulation time period). Once the exposure amount exceeds a certain value, however, the output signal voltage becomes incapable of increasing any more. This output signal voltage incapable of increasing any more is called a "saturation output voltage". Also, an exposure amount giving the saturation output voltage is called a "saturation exposure amount". As this value increases, a usable signal voltage amplitude is increased and a dynamic range (ratio between the saturation exposure amount and a noise such as a dark output) is also increased. As a result, it is required to increase the saturation output voltage as much as possible from the viewpoint of the performance of the image sensor.

In the case of the color linear image sensor described above, the saturation output voltages of the three linear image sensors provided with the color filters become the same unless the sizes of the photodiodes or the CCD shift registers are intentionally changed or the maximum signal voltage amplitudes are intentionally changed in respective output circuits.

Also, as described above, it is preferable that the saturation output voltages are increased as much as possible from the viewpoint of the performance of the color image sensor. Therefore, it is natural that the same saturation output voltage is set for the three colors. In the case of the color linear image sensor described above, however, the output sensitivities (output signal voltages/exposure amounts) of RGB outputs are usually not the same. Further, even if the RGB outputs have the same sensitivity under a certain light source, when the light source to be used is changed, differences may occur in sensitivity among the RGB outputs. Accordingly, in general, relationships shown in FIG. 3 exist between the exposure amounts and the signal output voltages in the color linear image sensor. FIG. 3 shows a case where among the RGB outputs, the green output has the maximum sensitivity and the blue output has the minimum sensitivity.

As can be seen from FIG. 3, although the RGB outputs originally have the same saturation output voltage Vsat, it is impossible to increase output values of the red and blue outputs above VsaR and VsaB, respectively, with the green output having the maximum sensitivity. This is because when this color linear image sensor is used while exceeding a saturation exposure amount SEG (exposure amount giving the saturation output voltage of the green output), the green output exceeds the saturation output voltage and it becomes impossible to obtain normal green image data. Also, there is a fear in that signal charges may overflow from the photodiode portion or the CCD shift register related to the green output and flow to other photodiode portions or CCD shift registers related to the remaining two colors, thereby causing color mixture. In either case, in this example, the green output has the maximum substantial saturation output voltage and the blue output has the minimum substantial saturation output voltage, which leads to a situation where differences occur in dynamic range among respective colors and an influence is exerted on image quality.

In view of this problem, a shutter structure has conventionally been used, as described above. With this construction, it becomes possible to independently control the accumulation time periods for the RGB colors while setting the same light amount for these colors. A driving method used in this case is shown in a timing chart of FIG. 4. By independently adjusting driving pulses applied to the shutter gates for respective colors, an optimum exposure amount is obtained for each color and it becomes possible to use the linear image sensor until a saturation output voltage common to the three colors is reached.

When a linear image sensor having two photodiode arrays is provided with the shutter structure described in the above conventional example between the photodiodes in order to improve MTF between the photodiodes or the like, there is a case where a distance between the two photodiode arrays becomes a problem.

In a scanner or a copying machine using a linear image sensor, the linear image sensor is mechanically scanned in an auxiliary scanning direction that is perpendicular to a main scanning direction in which photodiode arrays are provided. In order to obtain image information of a predetermined area of a subject, after the first photodiode array finishes scanning the predetermined area of the subject, it is necessary to externally store information until the second photodiode array finishes scanning the predetermined area and to perform alignment and signal processing on the information. As a result, it is necessary to use an external memory.

In a linear image sensor of 10600-pixel class that is applied to a high-resolution scanner or copying machine, for instance, when a gray scale (gradation between black and white) is expressed using 12 bits, the capacity of a memory required becomes as follows.

$$C = 10600 \times 12 \times (M+1) \text{ bits} \qquad (1)$$

where, M is a value obtained by expressing the interline distance between the two photodiode arrays using the number of scanning operations.

When the size of each photodiode is 4 μm×4 μm and the interline distance between the photodiode arrays is 12 μm, for instance, M becomes as follows.

$$M = 12 \text{ μm} / 4 \text{ μm} = 3 \qquad (2)$$

As a result, the external memory is required to have a capacity of 508800 bits. As can be seen from Equation (1) described above, in order to reduce the capacity of the external memory, it is necessary to shorten the interline distance between the photodiode arrays, thereby reducing the number of scanning operations performed between the scanning by the first photodiode array and the scanning by the second photodiode array.

Further, mechanical scanning is performed in the auxiliary scanning direction, so that there also exists a phenomenon called "color drift". Assuming that scanning drift Y having the same amount occurs each time a scanning operation is performed, for instance, the total amount of drift occurring between the scanning by the first photodiode array and the scanning by the second photodiode array becomes as follows.

$$YA = M \times Y \qquad (3)$$

As can be seen from this Equation (3), in order to reduce the color drift, it is necessary to shorten the interline distance, thereby reducing the number of scanning operations performed between the scanning by the first photodiode array and the scanning by the second photodiode array.

Further, as can be seen from FIG. 2, factors generating this interline distance M are the total width of two polycrystalline silicon electrodes constituting the shutter gates and the N-type region constituting the shutter drain.

When a color linear image sensor is produced using this linear image sensor, it is apparent due to the same reason as above that when interline distances among respective colors are shortened, the number of scanning operations performed between the scanning for the first color and the scanning for the third color is reduced. As a result, it becomes apparently possible to reduce a capacity of a memory used and to suppress an influence of the color drift.

SUMMARY OF THE INVENTION

The present invention has been made in order to solve the problems described above, and provides a linear image sensor in which the number of scanning operations performed in the auxiliary scanning direction to obtain image data for one line is reduced by reducing a layout area. With such a linear image sensor, it becomes possible to reduce the capacity of a memory used and to suppress the influence of the color drift.

According to a first construction of the present invention, a linear image sensor includes: photodiode arrays; and a shutter structure provided parallel to the photo diode arrays, the shutter structure having: a shutter electrode; and a shutter drain provided below the shutter gate electrode constituting the shutter structure.

In the linear image sensor according to the first construction of the present invention, the number of the photodiode arrays may be set at one. Further, an upper portion of the shutter drain may be covered with the shutter gate electrode.

According to a second construction of the present invention, a linear image sensor includes: photodiode arrays; and a shutter structure provided between the photodiode arrays, the shutter structure having: a shutter gate electrode; and a shutter drain provided below the shutter gate electrode.

Further, in the linear image sensor according to the second construction of the present invention, an upper portion of the shutter drain may be covered with the shutter gate electrode.

According to a third construction of the present invention, a linear image sensor includes: a photodiode array; a readout gate provided parallel to the photodiode array on one side of the photodiode array; a CCD shift register provided parallel to the readout gate; an output circuit provided for output from the CCD shift register; and a shutter structure provided parallel to the photodiode array on the other side of the photodiode array, the shutter structure having: a shutter gate electrode that is provided parallel to the photodiode array on the other side of the photodiode array; and a shutter drain provided below the shutter gate electrode.

According to the present invention, the number of shutter gates provided between photodiodes is reduced from two as in the case of the conventional technique to one (common electrode), and an N-type region constituting a shutter drain is provided below the shutter gate. Also, even if only one photodiode array is used, the shutter drain is provided below the shutter gate, thereby capable of reducing a layout pattern area required to achieve a shutter structure.

With the construction of the present invention, in a linear image sensor in which a shutter structure is provided between photodiode arrays, the distance between the photodiodes is shortened, thereby reducing the number of scanning operations performed in the auxiliary scanning direction necessary to obtain image data for one line. With such a construction, it becomes possible to reduce the capacity of a memory used and to suppress the influence of the color drift.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will now be described in detail with reference to the accompanying drawings.

<First Embodiment>

Figure 1:
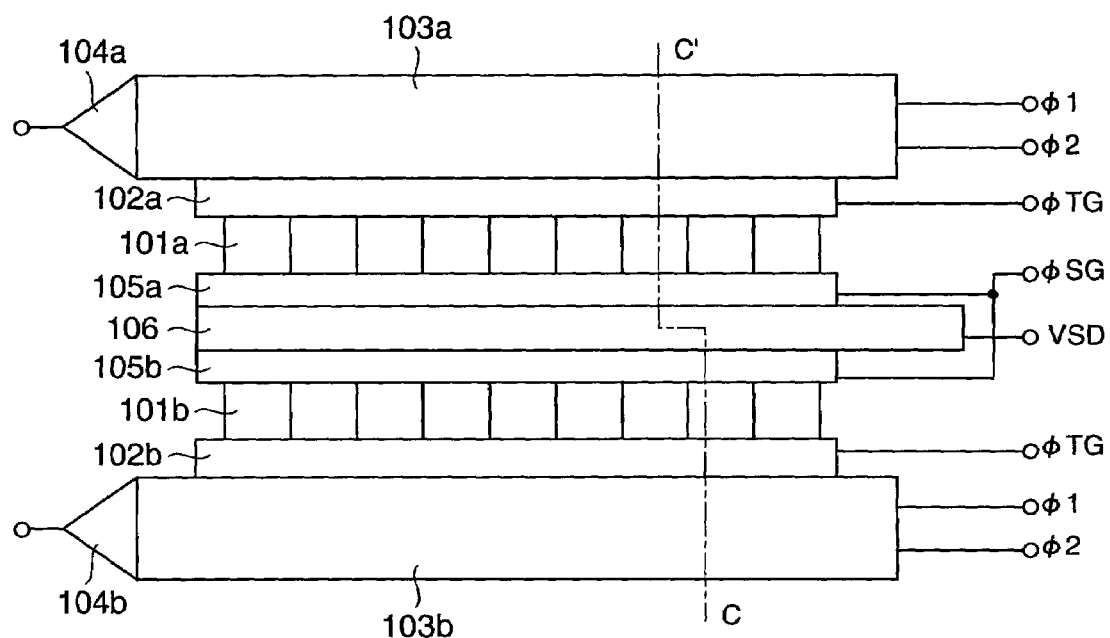
FIG. 1 is a schematic plan view showing a layout of a linear image sensor according to a conventional example.
Figure 2:
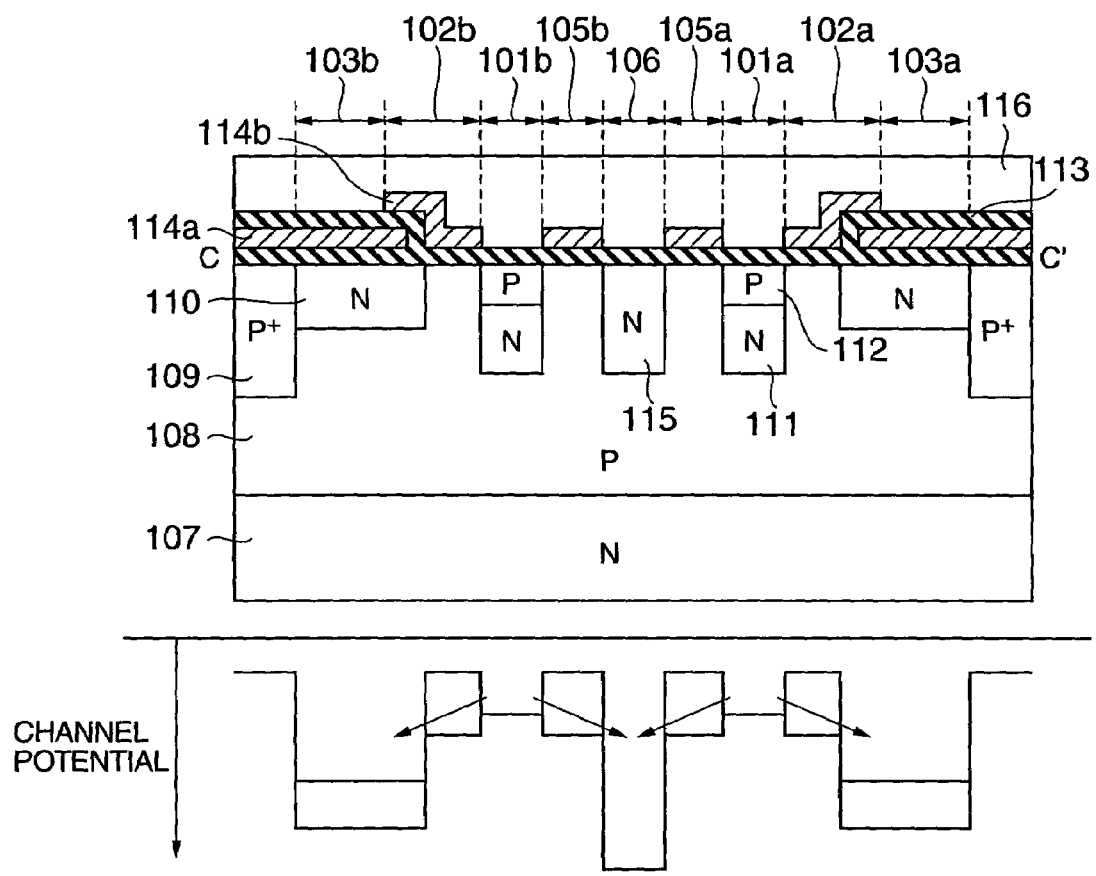
FIG. 2 is a cross-sectional view taken along the line C-C' of FIG. 1 and is a channel potential distribution diagram thereof.
Figure 3:
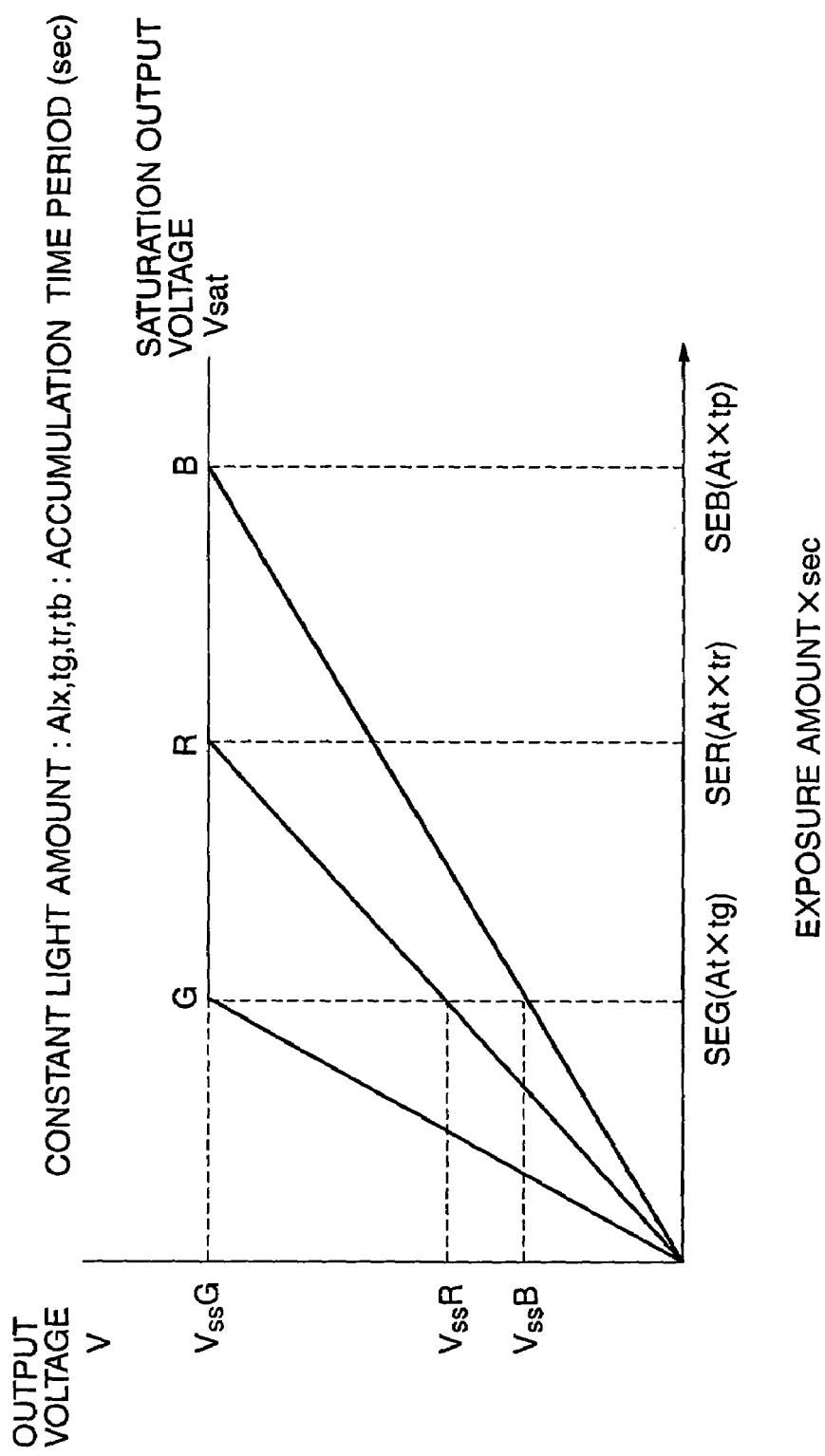
FIG. 3 is a graph illustrating output characteristics of an operation of the liner image sensor shown in FIG. 1.
Figure 4:
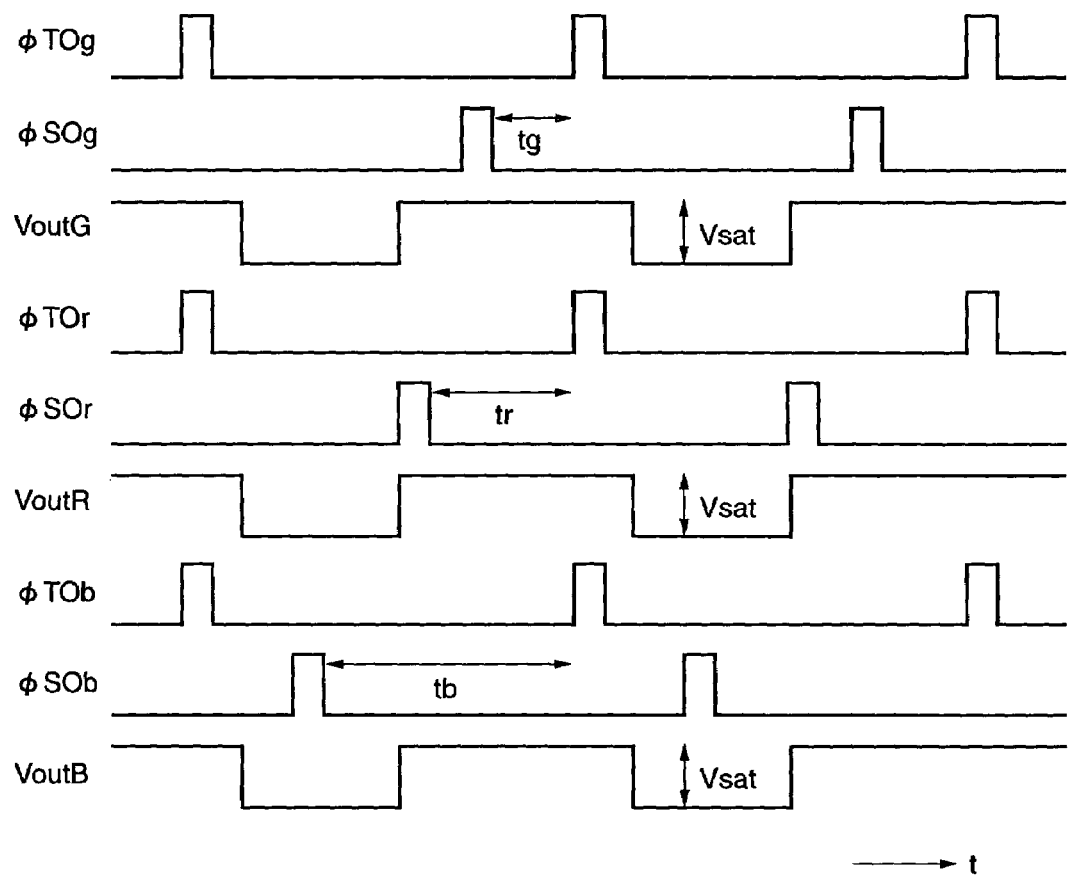
FIG. 4 is an operating waveform diagram illustrating operation timings of the linear image sensor shown in FIG. 1.
Figure 5:
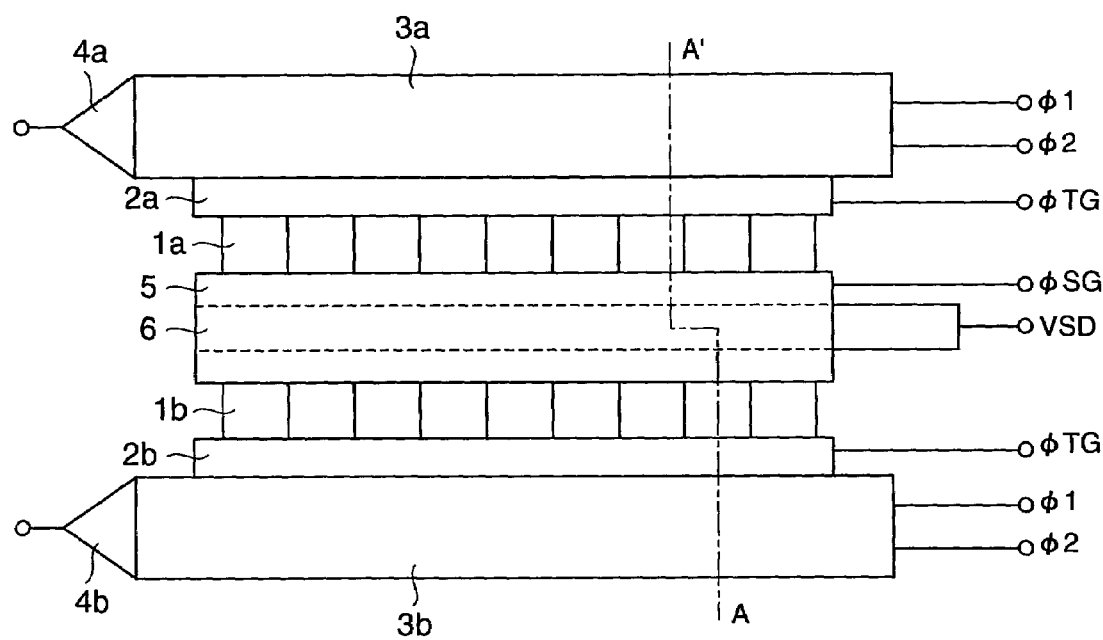
FIG. 5 is a schematic plan view showing a layout of a linear image sensor according to a first embodiment of the present invention.
Figure 6:
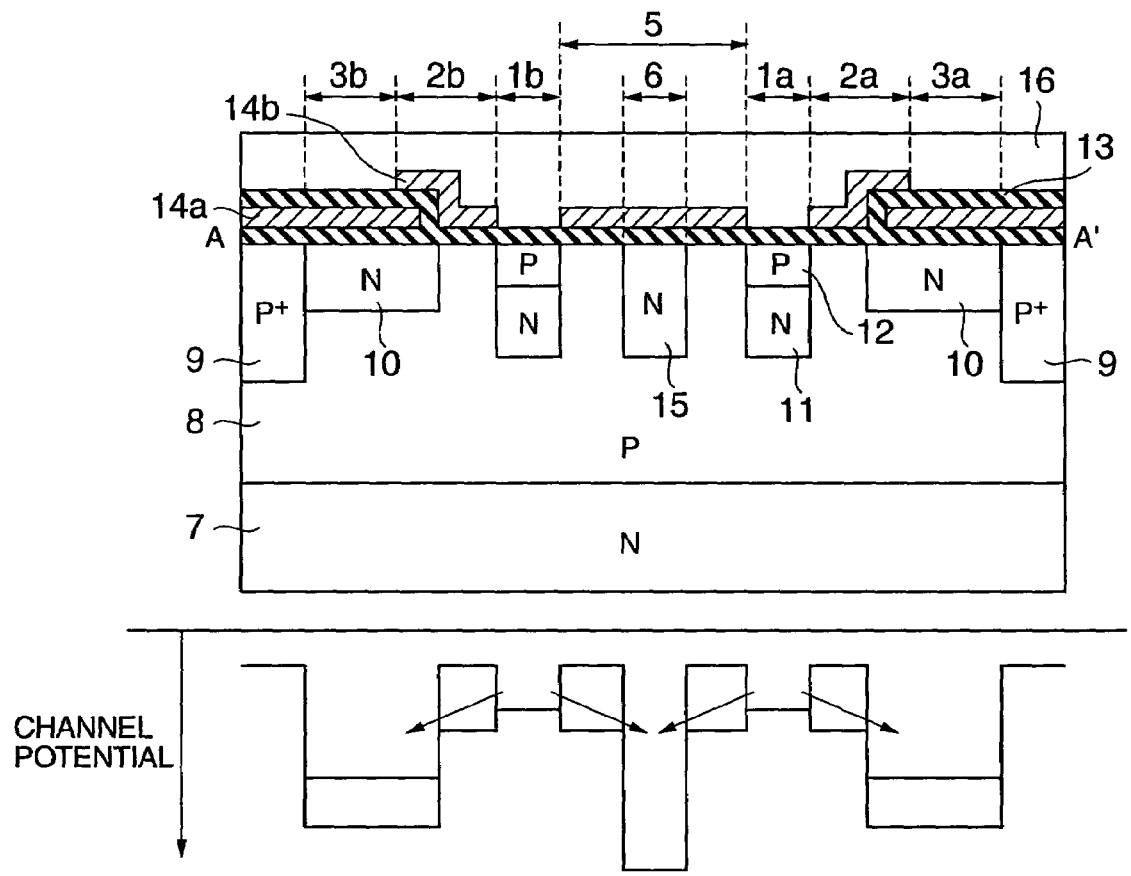
FIG. 6 is a cross-sectional view taken along the line A-A' of FIG. 5 and is a channel potential distribution diagram thereof.

FIG. 5 is a schematic plan view showing an overall layout of a linear image sensor according to a first embodiment of the present invention, and FIG. 6 is a cross-sectional view taken along the broken line A-A' of FIG. 5. In this embodiment, a construction of a conventional example shown in FIGS. 1 and 2 is changed so that two shutter gate electrodes 105a and 105b that are respectively provided adjacent to photodiode arrays 101a and 101b are replaced with a single common shutter gate electrode 5, and a shutter drain 106 existing between the shutter gate electrodes 105a and 105b is replaced with a shutter drain 6 provided below the shutter gate electrode 5. Other constructions are the same as those of the conventional example.

The construction of this embodiment is obtained by, first, forming a P-well 8 through injection of P-type impurities into an N-type silicon substrate 7. Then, on the P-well 8, there are provided photodiode arrays 1a and 1b that are each formed of an N-type region 11 and a P-type region 12, readout gates 2a and 2b and the shutter gate 5 that are each formed of a polycrystalline silicon electrode 14b, CCD shift registers 3a and 3b that are each formed of a polycrystalline silicon electrode 14a and an N-type region 10, and the shutter drain 6 formed of an N-type region 15.

Further, in FIG. 6, reference numeral 9 denotes P-type regions that are each an element isolation region, numeral 13 a thermal oxidation film, and numeral 16 an interlayer insulating film. Here, a metallic wiring made of aluminum or the like for supplying an input clock signal to each of the polycrystalline silicon electrodes 14a and 14b is omitted because the metallic wiring is not required for explanation of the present invention.

An operation of this embodiment will be described next. First, electric charges photoelectrically converted by and accumulated in each photodiode of the photodiode arrays 1a and 1b are read by the readout gates 2a and 2b into CCD shift registers 3a and 3b that are respectively adjacent to the readout gates 2a and 2b. The electric charges read into the CCD shift registers are sequentially transferred by the CCD shift registers that perform two-phase ($\phi1$, $\phi2$) driving, and are outputted to the outside by output circuits 4a and 4b. The output circuits 4a and 4b are each formed of a signal charge detection unit and an analog circuit such as a source follower circuit or an inverter. Here, the signal charge detection unit is formed of a floating diffusion region and converts signal charges into a signal voltage.

On the other hand, the shutter gate 5 is positioned on a side opposite to the readout gates 2a and 2b with the photodiode arrays 1a and 1b in-between, and discharges the electric charges photoelectrically converted by and accumulated in each photodiode of the photodiode arrays 1a and 1b to the shutter drain 6, thereby performing adjustment of an accumulation time period.

In the conventional construction, the two shutter gate electrodes 105a and 105b are provided and the shutter drain structure 106 is provided between these shutter gate electrodes 105a and 105b. Therefore, a lower limit of a space between the two photodiode arrays 101a and 101b is determined by a sum of the minimum total width of the two polycrystalline silicon electrodes 105a and 105b constituting the shutter gates and the minimum space between the polycrystalline silicon electrodes 105a and 105b. When the minimum width of each polycrystalline silicon electrode is 3.0 µm and the minimum space between the polycrystalline silicon electrodes is 1.0 µm, for instance, the space between the photodiode arrays 101a and 101b becomes "3.0×2+ 1.0=7.0 µm".

In contrast to this, in this embodiment, the shutter gate electrode 5 is set to be a common electrode and the shutter drain structure (6) is provided below the shutter gate electrode 5, so that the space between the two photodiode arrays 1a and 1b is determined only by the minimum width of the polycrystalline silicon electrode 5 constituting the shutter gate. In the case of the example described above, the space between the photodiode arrays 1a and 1b becomes 3.0 µm, which makes it possible to realize the same shutter structure with a layout area reduced to one half or less.

With this construction, the number of scanning operations performed in the auxiliary scanning direction necessary to obtain image data for one line can be reduced. As a result, it becomes possible to reduce a capacity of a memory used and to suppress an influence of color drift.

<Second Embodiment>

Figure 7:
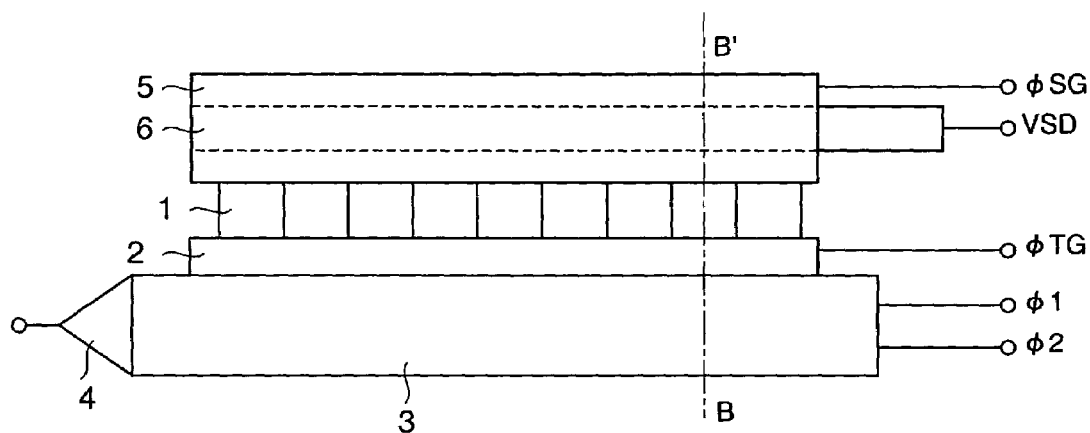
FIG. 7 is a schematic plan view showing a layout of a linear image sensor according to a second embodiment of the present invention.
Figure 8:
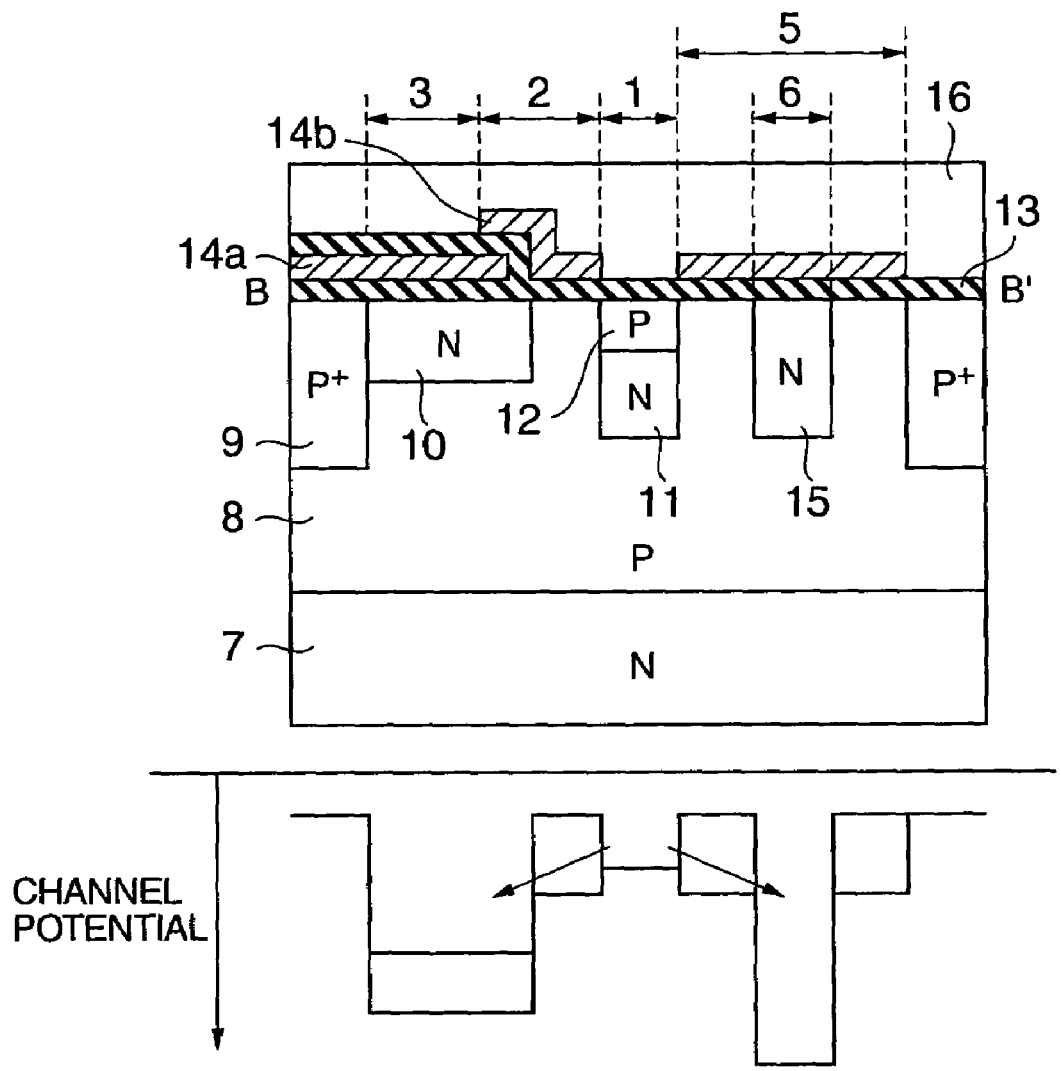
FIG. 8 is a cross-sectional view taken along the line B-B' of FIG. 7 and is a channel potential distribution diagram thereof.

FIG. 7 is a schematic plan view showing an overall layout of a linear image sensor according to a second embodiment of the present invention, and FIG. 8 is a cross-sectional view taken along the broken line B-B' of FIG. 7. In these drawings, the same construction elements as those of FIGS. 5 and 6 are given the same reference numerals. As can be seen from FIGS. 7 and 8, the second embodiment differs from the first embodiment in that only one photodiode array 1 is provided.

That is, the photodiode arrays 1a and 1b are replaced with the photodiode array 1, the readout gates 2a and 2b are replaced with a single readout gate 2, the CCD shift registers 3a and 3b are replaced with a single CCD shift register 3, and the output circuits 4a and 4b are replaced with a single output circuit 4. Also, a single shutter gate 5 and a single shutter drain 6 are provided. The same operation as that of the first embodiment is performed in this embodiment.

When a color linear image sensor is constructed using the linear image sensor of the second embodiment, it becomes possible to reduce interline distances among respective colors, which makes it possible to reduce the number of scanning operations performed in the auxiliary scanning direction necessary to obtain image data for one line. As a result, it becomes possible to reduce the capacity of a memory used and to suppress the influence of the color drift. Also, when line spaces among respective colors are kept the same, the layout pattern area for other portions such as photodiodes, the readout gate, and the CCD shift register can be increased.

As described above, with the construction of the present invention, the shutter drain constituting the shutter structure is provided below the shutter gate, so that the layout pattern area for the shutter structure can be reduced and the number of scanning operations performed in the auxiliary scanning direction necessary to obtain image data for one line can be also reduced. Consequently, an effect is provided in that it becomes possible to reduce the capacity of a memory used and to suppress the influence of the color drift.

Further, when the color linear image sensor is constructed using the linear image sensor according to the second embodiment, it becomes possible to shorten the interline distances among the respective colors, which reduces the number of scanning operations performed in the auxiliary scanning direction necessary to obtain the image data for one line. Consequently, the capacity of a memory used can be reduced and the influence of the color drift can also be suppressed. Also, when the line spaces among the respective colors are kept the same, an effect is provided in that it becomes possible to increase the layout pattern area for other portions such as the photodiodes, the readout gate, and the CCD shift register.

What is claimed is:

1. A linear image sensor comprising:
   a photodiode array; and
   a shutter structure provided parallel to the photodiode array, the shutter structure including: a shutter drain and a shutter gate provided between said photodiode array and said shutter drain, said shutter gate being continuously extended beyond said shutter drain on a side of said shutter drain opposite to said photodiode array.

2. A linear image sensor according to claim 1, wherein an upper portion of the shutter drain is covered with the shutter gate.

3. A linear image sensor according to claim 1, wherein the linear image sensor includes only a single photodiode array.

4. A linear image sensor according to claim 1, wherein said photodiode array is a first photodiode array and the linear image sensor further comprises a second photodiode array, wherein the shutter structure is provided between the first and second photodiode arrays.

5. A linear image sensor comprising:
   a photodiode array;
   a readout gate provided parallel to the photodiode array on one side of the photodiode array;
   a CCD shift register provided parallel to the readout gate;
   an output circuit provided for output from the CCD shift register; and
   a shutter structure provided parallel to the photodiode array on the other side of the photodiode array, the shutter structure including: a shutter drain and a shutter gate provided between said photodiode array and said shutter drain, said shutter gate further continuously extending across said shutter drain.

6. A linear image sensor according to claim 5, wherein an upper portion of the shutter drain is covered with the shutter gate.

7. A linear image sensor comprising:
   a photodiode array pair provided parallel to each other;
   a shutter gate electrode that is provided parallel to the photodiode array pair so as to be common to the photodiode array pair; and
   a shutter drain that is provided below the shutter gate electrode;
   wherein said shutter electrode is provided between each of said photodiode array pair and said shutter drain, said shutter electrode extending to directly above said shutter drain so that said shutter gate electrode becomes a single shutter gate electrode.

8. A linear image sensor according to claim 7, wherein an upper portion of the shutter drain is covered with the shutter gate electrode.

9. A linear image sensor according to claim 7, wherein:
   three pairs of the photodiode array pair are provided parallel to one another; and
   each photodiode array pair includes one of color filters having different colors that are RGB.

* * * * *